US012343857B2

(12) United States Patent
Dick

(10) Patent No.: US 12,343,857 B2

(45) **Date of Patent: *Jul. 1, 2025**

(54) SLIDING ROTATING STORAGE UNIT

(71) Applicant: Milwaukee Electric Tool Corporation, Brookfield, WI (US)

(72) Inventor: Ryan C. Dick, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,008

(22) Filed: May 7, 2024

(65) Prior Publication Data

US 2024/0286269 A1 Aug. 29, 2024

Related U.S. Application Data

(63) Continuation of application No. 17/554,880, filed on Dec. 17, 2021, now Pat. No. 12,005,565, which is a continuation of application No. PCT/US2021/061856, filed on Dec. 3, 2021.

(60) Provisional application No. 63/122,294, filed on Dec. 7, 2020.

(51) Int. Cl.
*B25H 3/02* (2006.01)

(52) U.S. Cl.
CPC ............. *B25H 3/028* (2013.01); *B25H 3/025* (2013.01); *B25H 3/026* (2013.01)

(58) Field of Classification Search
CPC ........ B25H 3/026; B25H 3/025; B25H 3/028; A47B 88/60; A47B 88/40; A47B 88/48; A47B 46/00; A47B 46/005; A47B 49/002
See application file for complete search history.

(56) References Cited

U.S. PATENT DOCUMENTS

| | | | | |
|---|---|---|---|---|
| 1,108,281 A | | 8/1914 | Uffner | |
| 5,064,256 A | * | 11/1991 | Shepherd | A47B 88/48 312/221 |
| 6,176,559 B1 | | 1/2001 | Tiramani et al. | |
| 6,347,847 B1 | | 2/2002 | Tiramani et al. | |
| 6,578,937 B1 | | 6/2003 | Thoman | |
| 6,601,930 B2 | | 8/2003 | Tiramani et al. | |

(Continued)

FOREIGN PATENT DOCUMENTS

| | | |
|---|---|---|
| CN | 204800609 | 11/2015 |
| CN | 105291075 | 2/2016 |

(Continued)

OTHER PUBLICATIONS

International Search Report and Written Opinion for International Application No. PCT/US2021/061856, dated Mar. 24, 2002, 10 pages.

(Continued)

*Primary Examiner* — Daniel J Rohrhoff

(74) *Attorney, Agent, or Firm* — Reinhart Boerner Van Deuren s.c.

(57) ABSTRACT

Various embodiments of a storage device are provided. The storage device includes one or more storage compartment that are slideable with respect to sidewalls of the storage device. The containers are also rotatable with respect to the sidewalls of the storage device, thereby permitting improved accessibility to the storage compartment in the container.

20 Claims, 6 Drawing Sheets

(56) References Cited

U.S. PATENT DOCUMENTS

| | | | | |
|---|---|---|---|---|
| 7,140,703 | B1 | 11/2006 | Holdgate, III et al. | |
| 7,775,613 | B2 * | 8/2010 | Williams | A47B 46/005 312/325 |
| 7,832,584 | B2 | 11/2010 | Eggers et al. | |
| 8,657,307 | B2 | 2/2014 | Lifshitz et al. | |
| 8,926,031 | B2 * | 1/2015 | Belton | A47B 88/402 312/246 |
| 9,328,955 | B2 | 5/2016 | Castro Solis et al. | |
| D803,560 | S | 11/2017 | Kuhls | |
| D803,561 | S | 11/2017 | Kuhls | |
| 10,047,546 | B2 | 8/2018 | Brunner | |
| 10,182,628 | B2 | 1/2019 | Tonelli et al. | |
| 10,286,542 | B2 | 5/2019 | Wolle et al. | |
| 10,293,477 | B2 | 5/2019 | Wolle et al. | |
| 10,314,399 | B2 | 6/2019 | Wolle et al. | |
| 10,959,520 | B2 * | 3/2021 | Filipowicz | A47B 88/60 |
| 12,005,565 | B2 * | 6/2024 | Dick | A47F 5/0037 |
| 2002/0117947 | A1 * | 8/2002 | Cheng | A47B 87/008 312/330.1 |
| 2004/0245199 | A1 * | 12/2004 | Chen | A47B 88/48 211/186 |
| 2005/0248245 | A1 * | 11/2005 | Ceccarelli | A47B 88/48 312/323 |
| 2006/0006770 | A1 | 1/2006 | Valentini | |
| 2009/0145790 | A1 | 6/2009 | Keeler | |
| 2017/0151913 | A1 * | 6/2017 | Granzotto | A47B 88/41 |
| 2018/0161975 | A1 | 6/2018 | Brunner | |
| 2018/0186513 | A1 | 7/2018 | Brunner | |
| 2018/0200875 | A1 | 7/2018 | Wolle et al. | |
| 2019/0106244 | A1 | 4/2019 | Brunner et al. | |
| 2020/0229599 | A1 | 7/2020 | Filipowicz | |
| 2020/0348075 | A1 | 11/2020 | Zhu et al. | |
| 2021/0022497 | A1 * | 1/2021 | Nahin | A47B 88/48 |
| 2023/0234211 | A1 * | 7/2023 | Adams | B25H 3/02 312/330.1 |

FOREIGN PATENT DOCUMENTS

| | | |
|---|---|---|
| CN | 206643887 | 11/2017 |
| CN | 209014323 | 6/2019 |
| DE | 4207878 | 9/1993 |
| DE | 29812086 | 10/1998 |
| DE | 102012218653 | 4/2013 |
| DE | 202014103228 | 11/2015 |
| DE | 212017000011 | 3/2018 |
| EP | 0482337 | 12/1997 |
| EP | 1563965 | 12/2006 |
| JP | 2005/087365 | 4/2005 |
| KR | 10-1999-0074444 | 10/1999 |
| WO | WO05021221 | 3/2005 |
| WO | WO19081711 | 5/2019 |

OTHER PUBLICATIONS

"DEWALT 12-Compartment Small Parts Organizer Flip Bin," Homedepot.com, 9 pages, https://www.homedepot.com/p/DEWALT-12-Compartment-Small-Parts-Organizer-Flip-Bin-DWST14121/305666804.

* cited by examiner

SLIDING ROTATING STORAGE UNIT

CROSS-REFERENCE TO RELATED PATENT APPLICATIONS

The present application is a continuation of U.S. application Ser. No. 17/554,880, filed on Dec. 17, 2021, which is a continuation of International Application No. PCT/US2021/061856, which was filed on Dec. 3, 2021, which claims the benefit of and priority to U.S. Provisional Application No. 63/122,294, filed on Dec. 7, 2020, each of which is incorporated herein by reference in its entirety.

BACKGROUND OF THE INVENTION

The present disclosure is directed generally to storage compartments, units and/or devices. The present disclosure relates specifically to storage units that slide and rotate with respect to sidewalls to provide improved accessibility to an internal storage compartment.

Storage units are generally used to store and/or organize tools, equipment and other objects. Storage units include one or more containers that actuate between stowed positions in which the storage compartment is not accessible, and one or more open positions in which the tools, equipment and other objects can be retrieved.

SUMMARY OF THE INVENTION

One embodiment of the invention relates to a storage device including a first sidewall, a second sidewall opposite the first sidewall, and a storage element defining a storage compartment within the storage element. The storage element is slidably and rotatably coupled to each of the first sidewall and the second sidewall. The storage element slidably actuates with respect to the first and second sidewalls between a stowed position in which the storage element is retracted within the storage device and a forward position in which the storage element extends past a front of the first sidewall and a front of the second sidewall. When the storage element is in the forward position the storage element rotatably actuates with respect to the first and second sidewalls between a first position in which a top of the storage element faces vertically upward and a second position in which the top of the storage element faces upward and forward.

Another embodiment of the invention relates to a storage device including a first sidewall, a second sidewall opposite the first sidewall, and a storage element defining a storage compartment. The storage compartment is accessible through an upper opening defined by the storage element. The storage element is slidably and rotatably coupled to each of the first sidewall and the second sidewall. The storage element rotatably actuates with respect to the first and second sidewalls between a first position in which the upper opening is partially between the first and second sidewalls and a second position in which the entire upper opening is located in front of both the first and second sidewalls.

Another embodiment of the invention relates to a storage device. The storage device includes a first sidewall, a first upper channel, a first lower channel, a second sidewall, a second upper channel, a second lower channel, a storage element, a first upper protrusion, a first lower protrusion, a second upper protrusion, and a second lower protrusion. The first upper channel extends laterally through the first sidewall from a first end to a second end. The first upper channel includes a middle portion lower than each of the first end and the second end. The first lower channel extends laterally through the first sidewall below the first upper channel. The second sidewall is opposite the first sidewall. The second upper channel extends laterally through the second sidewall from a first end to a second end. The second upper channel includes a middle portion lower than each of the first end and the second end. The second lower channel extends laterally through the second sidewall below the second upper channel. The storage element defines a storage compartment within the storage element. The storage element is slidably and rotatably coupled to each of the first sidewall and the second sidewall. The first upper protrusion extends from the storage element and is slideably engaged with the first upper channel. The second upper protrusion extends from the storage element away from the first upper protrusion. The second upper protrusion is slideably engaged with the second upper channel. The first lower protrusion extends from the storage element and is slideably engaged with the first lower channel. The second lower protrusion extends from the storage element away from the second lower protrusion. The second lower protrusion is slideably engaged with the second lower channel.

Another embodiment of the invention relates to a storage device including a first sidewall, a second sidewall opposite the first sidewall, a container including a storage compartment, the container slidably and rotatably coupled to each of the first sidewall and the second sidewall. The container slideably actuates between a stowed position in which the container is recessed between the first sidewall and the second sidewall, and a forward position in which the container partially extends past a front of the first sidewall and a front of the second sidewall. The container rotates between a first configuration and a second configuration when the container is in the forward position. In one embodiment, when the container is the stowed position, the container is prevented from rotating (e.g., by the engagement between the container and the sidewalls) relative to the first and second sidewalls.

In a specific embodiment, the container rotates at least 30 degrees with respect to a horizontal plane generally perpendicular to a vertical surface of the first sidewall and the second sidewall when the container moves from the first configuration to the second configuration. In a specific embodiment, an upper opening of the container is at least partially received between the first sidewall and the second sidewall when the container is in the first configuration, and the entirety of the upper opening of the storage compartment is located in front of the first sidewall and in front of the second sidewall when the container is in the second configuration.

Another embodiment of the invention relates to a storage device including a first sidewall, a second sidewall opposite the first sidewall and a container including a storage compartment. A first upper channel extends laterally within the first sidewall and a first lower channel extends laterally within the first sidewall below the first upper channel. A second upper channel extends laterally within the second sidewall and a second lower channel extends laterally within the second sidewall below the second upper channel. A first upper protrusion extends from the storage compartment and is slideably engaged with the first upper channel. A second upper protrusion extends from the storage compartment away from the first upper protrusion and is slideably engaged with the second upper channel. A first lower protrusion extends from the storage compartment and is slideably engaged with the first lower channel. A second lower protrusion extends from the storage compartment away from the second lower protrusion and is slideably engaged with the second lower channel.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a storage compartment, device, and/or unit are shown. In various embodiments, a storage device includes one or more storage compartment that are slideable with respect to sidewalls of the storage device. The containers described herein slide and rotate with respect to the sidewalls. As a result, the storage compartments of the containers are more accessible by permitting the container to rotate and slide with respect to the sidewalls compared to the accessibility of containers that only slide with respect to the sidewalls/housing.

The storage compartment starts from a stowed position in which the storage compartment is fully and/or mostly received between the sidewalls (e.g., the housing of the storage device). The storage compartment slides to a forward position with respect to the sidewalls. From the forward position, the storage compartment rotates with respect to the sidewalls to expose the upper opening of the storage compartment, thereby allowing easier access respect to the storage compartment than before the storage compartment was rotated.

Figure 1:
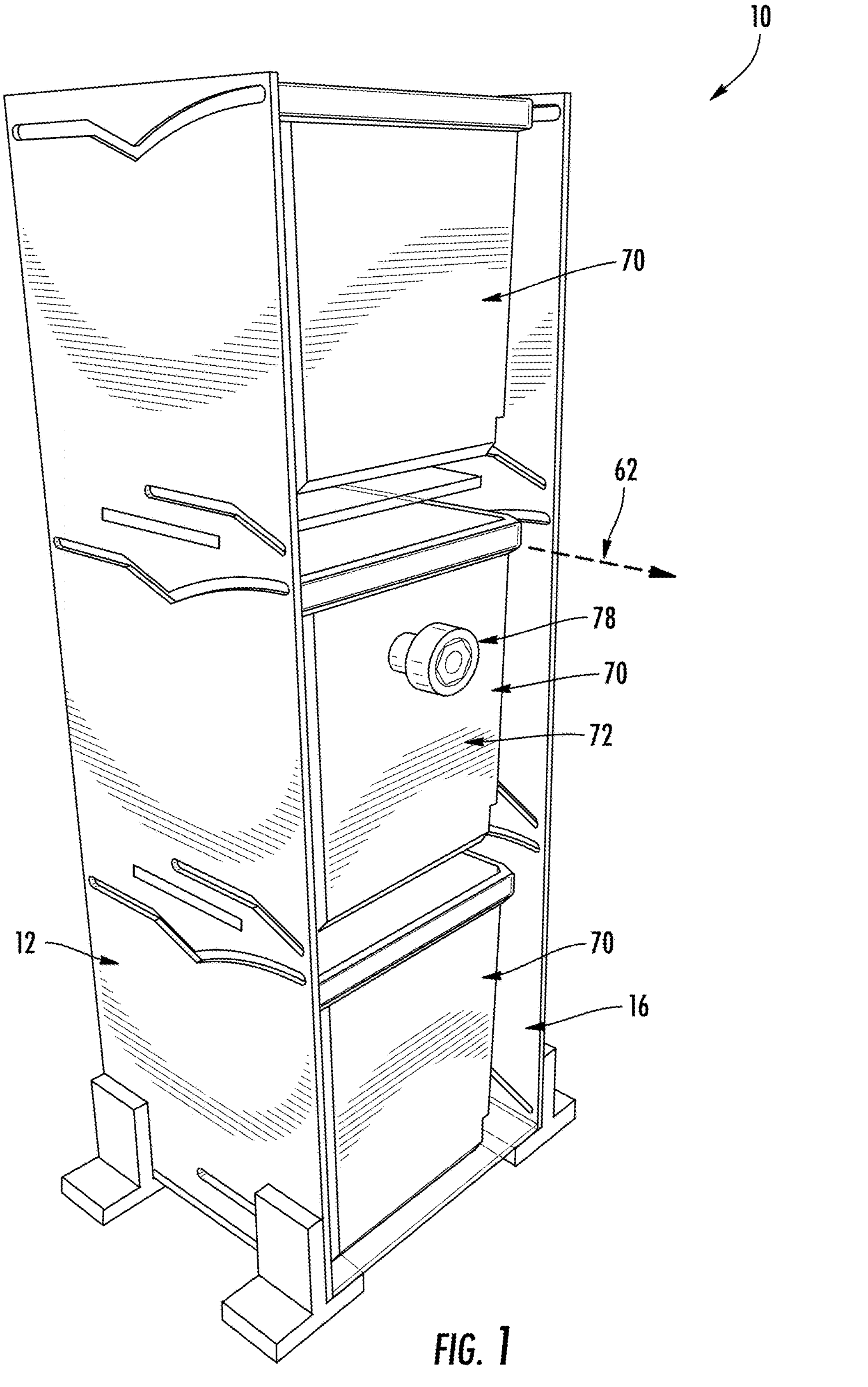
FIG. 1 is a perspective view of a storage device, according to an exemplary embodiment.
Figure 2:
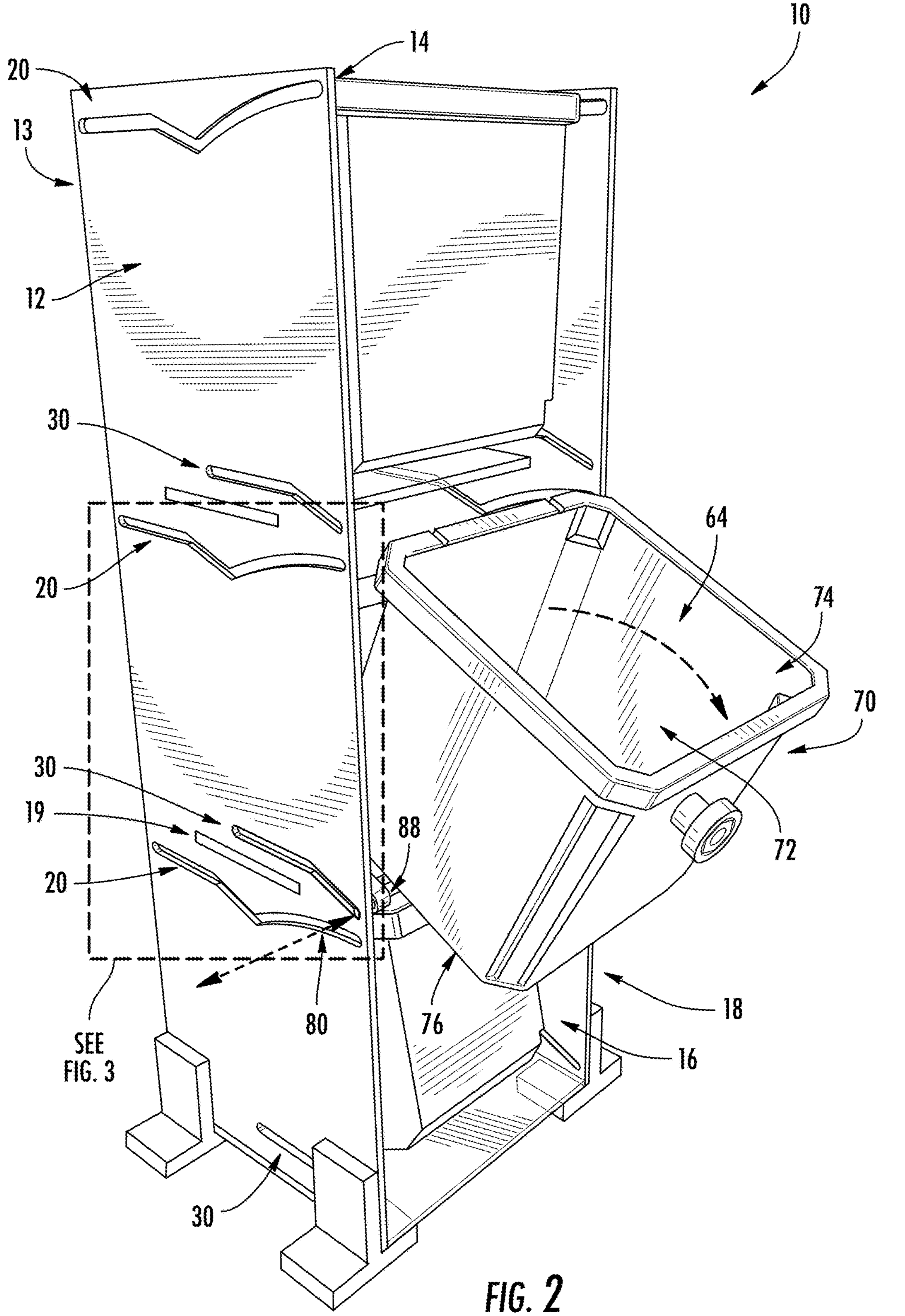
FIG. 2 is a perspective view of the storage device of FIG. 1, according to an exemplary embodiment.

Referring to FIGS. 1-2, a container, unit and/or device, shown as storage device 10, is shown according to an exemplary embodiment. Storage device includes one or more storage elements, shown as containers 70, that define a storage compartment 72 within the container 70. First sidewall 12 and second sidewall 16, which is opposite first sidewall 12, extend on either side of the one or more containers 70. In a specific embodiment, one or more rigid structures, shown as spacers 19, extend between first sidewall 12 and second sidewall 16 to maintain their relative positioning with respect to each other. In a specific embodiment, handle 78 is coupled to container 70 to facilitate moving sliding and/or rotating container 70.

Container 70 is slidably and rotatably coupled to each of the first sidewall 12 and the second sidewall 16, such as via frame 88. In particular, container 70 slides in direction 62 from a stowed position (FIG. 1), in which the storage element is retracted within the storage device, to a forward position (FIG. 2), in which the storage element extends past a front of the first sidewall and a front of the second sidewall. When container 70 in the forward position, the container 70 rotatably actuates with respect to the first and second sidewalls 12, 16 between a first position in which a top, shown as upper opening 74, of the container 70 faces vertically upward and a second position in which upper opening 74 of the container 70 faces upward and forward.

When in the forward position, container 70 rotates in direction 64 about axis 80 with respect to first and second sidewalls 12, 16 from a first position to a second position. In the first position, container 70 is partially closed within storage device 10 and extending from the housing and upper opening 74 is substantially horizontal and facing upwards. In the second position, upper opening 74 of container 70 is rotated forward so that storage compartment 72 is more accessible through upper opening 74. In this arrangement, container 70 is rotated such that upper opening 74 of container 70 moves from a substantially horizontal position to an angled position relative to a horizontal plane, and this rotated position allows a user more direct access to the contents of the container 70. In various embodiments, axis 80 extends between first and second sidewalls 12, 16 when container 70 is arranged in the second position (FIG. 2). In various embodiments, bottom wall 76 of container 70 defines a bottom of container 70 opposite upper opening 74, and at least a portion of the bottom wall 76 is between the first and second sidewalls 12, 16 when the container 70 is arranged in the second position. In a specific embodiment, when container 70 is in the opened configuration (e.g., the second position), upper opening 74 of container 70 is entirely and/or mostly positioned in front of front surface 14 of first sidewall 12 and front surface 18 of second sidewall 16 (FIG. 2), and when container 70 is in the partially closed configuration (e.g., the first position) upper opening 74 is partially received between first sidewall 12 and second sidewall 16. In various embodiments, the entire upper opening 74 is located in front of front surfaces 14, 18 of both the first and second sidewalls 12, 16 when container 70 is in the second position.

Figure 3:
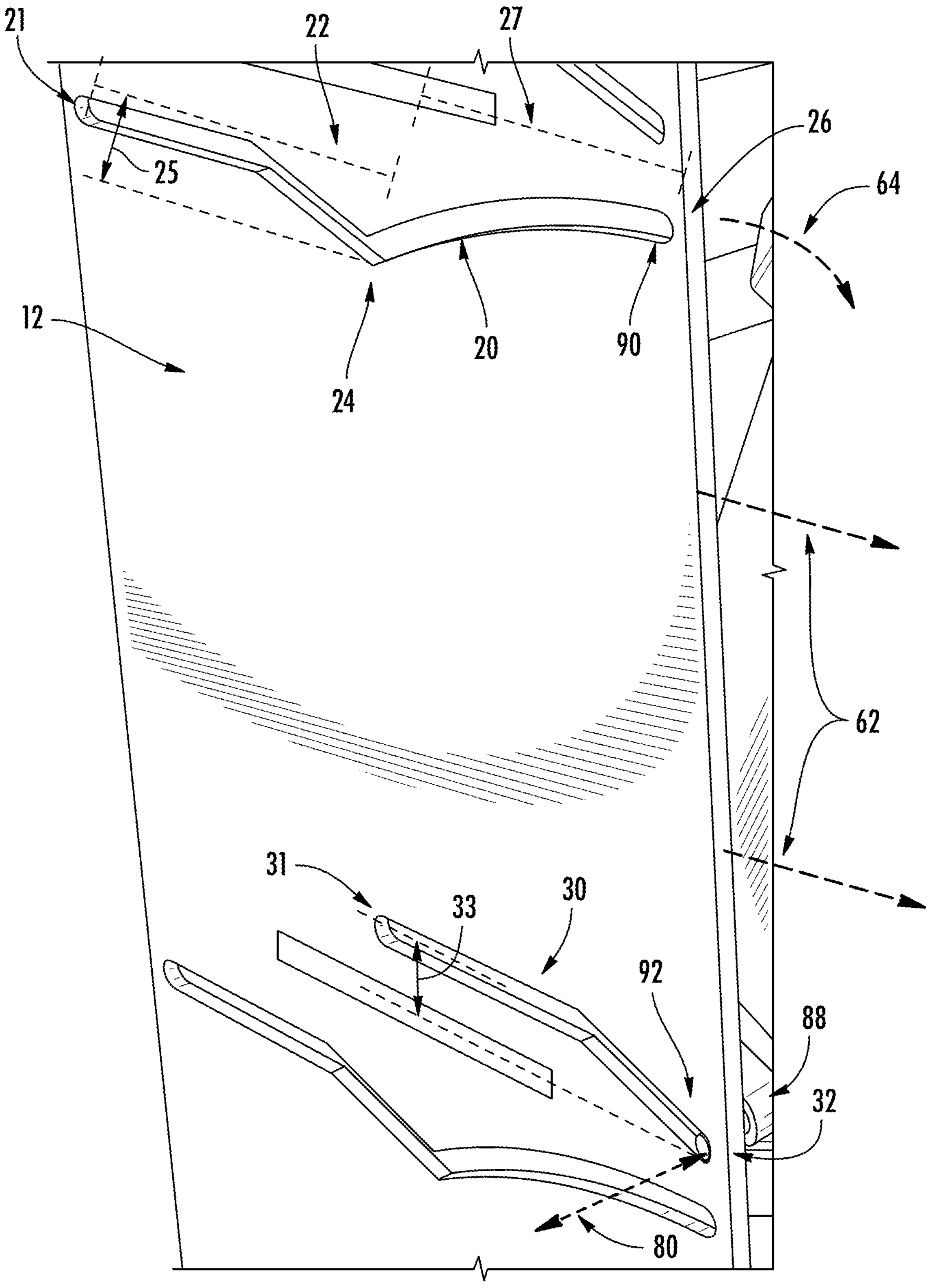
FIG. 3 is a detailed perspective view of the storage device of FIG. 1, according to an exemplary embodiment.
Figure 4:
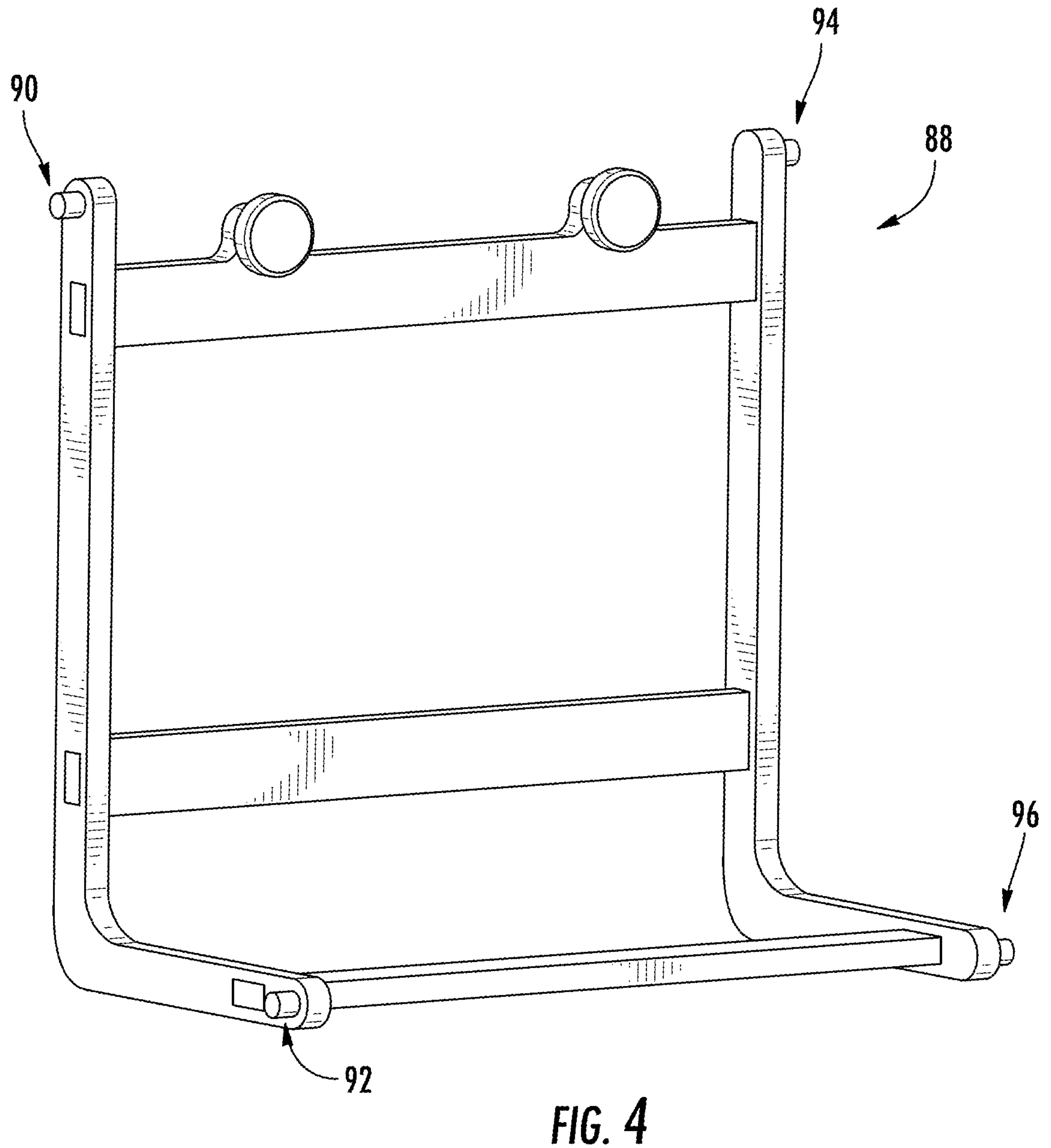
FIG. 4 is a perspective view of a portion of the storage device of FIG. 1, according to an exemplary embodiment.

Referring to FIGS. 3 and 4, slots and/or openings, shown as upper channel 20 and lower channel 30, extend laterally within first sidewall 12 from back surface 13 towards front surface 14. In various embodiments upper channel 20 extends laterally through the first sidewall 12 from a first end 21 to a second end 26, the first upper channel 20 including a middle portion, shown as dip 24, lower than each of the first end 21 and the second end 26. In various embodiments, lower channel 30 extends laterally through the first sidewall 12 below the first upper channel 20 from a first end 31 to a second end 32 lower than the first end 31 by a height 33. First upper protrusion 90 extends away from storage compartment 72 and slidably and rotatably engages with upper channel 20. First lower protrusion 92 extends away from storage compartment 72 and slidably and rotatably engages with lower channel 30.

In use, when container 70 is in the stowed position, first upper protrusion 90 is positioned at or near first end 21 of upper channel 20 and first lower protrusion 92 is positioned at or near first end 31 of lower channel 30. In various embodiments first sidewall 12 and second sidewall 16 are symmetrical with respect to each other, and as a result second upper protrusion 94 and second lower protrusion 96 are similarly near an end of their respective channels in second sidewall 16 when container 70 is in the stowed position. To access container 70, container 70 is moved in direction 62 with respect to first sidewall 12 from back surface 13 of sidewall toward front surface 14 of first sidewall 12.

As container 70 moves in direction 62 from the stowed position to the forward position, first upper protrusion 90 slides within upper channel 20 along first portion 22 from first end 21 to dip 24, and first lower protrusion 92 slides along lower channel 30 from first end 31 to second end 32. In an exemplary use, when first upper protrusion 90 is positioned at dip 24, first lower protrusion 92 is positioned at and/or near second end 32.

Container 70 is then rotated in direction 64 after container 70 is moved to the forward position such that container 70 moves from the first position to the second position. While container 70 is rotating in direction 64, first upper protrusion 90 slides along second portion 27 of upper channel 20 to second end 26, while first lower protrusion 92 remains stationary and/or mostly stationary within lower channel 30 and rotates within lower channel 30. In various embodiments first sidewall 12 and second sidewall 16 are symmetrical with respect to each other, and as a result second upper protrusion 94 and second lower protrusion 96 function similarly to first upper protrusion 90 and first lower protrusion 92, respectively. In an exemplary use, when first upper protrusion 90 is positioned at second end 26, first lower protrusion 92 is positioned at and/or near second end 32. In this arrangement, container 70 is rotated such that upper opening 74 of container 70 moves from a substantially horizontal position to an angled position relative to a horizontal plane, and this rotated position allows a user more direct access to the contents of the container 70. In a specific embodiment, upper opening 74 of container 70 rotates at least 15 degrees with respect to a horizontal plane and first and second sidewalls 12, 16 when container 70 moves from the first position to the second position, and more specifically at least 25 degrees, and more specifically at least 30 degrees.

In a specific embodiment, dip 24 is height 25 below first end 21 of upper channel 20, and second end 32 is height 33 below first end 31 of lower channel 30. In a specific embodiment, height 25 is equal to height 33. As a result, container 70 lowers with respect to first and second sidewalls 12, 16 by height 25 and/or height 33, which in various embodiments are equal, when container 70 is moved from (e.g. actuates from) a stowed position (FIG. 1) to a forward position, thereby permitting container 70 to rotate in direction 64 with little and/or no interference with structural elements above storage device 10 (e.g., from the container above the container being rotated).

In a specific embodiment, container 70 is coupled to frame 88. Frame 88 includes first upper protrusion 90 and second upper protrusion 94, which extend away from each other (FIG. 4). In a specific embodiment, first upper protrusion 90 and second upper protrusion 94 are axially aligned. Frame 88 includes first lower protrusion 92 and second lower protrusion 96, which extend away from each other. In a specific embodiment, first lower protrusion 92 and second lower protrusion 96 are axially aligned.

In various embodiments, first upper protrusion 90 extends from container 70 and slidably engages with the first upper channel 20 of first sidewall 12, and second upper protrusion 94 extends from the container 70 away from the first upper protrusion 90, the second upper protrusion 94 slidably engages with the second upper channel of the second sidewall 16. Further, first lower protrusion 92 extends from container 70 and slidably engages with the first lower channel 30 of first sidewall 12, and second lower protrusion 96 extends from container 70 away from the first lower protrusion 92 and the second lower protrusion 96 slidably engages with the second lower channel of second sidewall 16.

In various embodiments, sidewall 16 has a symmetrical structure to first sidewall 12 including, without limitation, second sidewall 16 including an upper channel and a lower channel that are symmetrical with upper channel 20 and lower channel 30 of first sidewall 12. Thus, all descriptions of first sidewall 12 and relating to first sidewall 12 are equally applicable to second sidewall 16.

In various embodiments, when container 70 slidably actuates with respect to the first and second sidewalls 12, 16 between a stowed position and a forward position, and when container 70 slides from the stowed position to the forward position, each of the first upper protrusion 90, the second upper protrusion 94, the first lower protrusion 92, and the second lower protrusion 96 slides within the respective channel the respective protrusion is engaged with (e.g., the first upper protrusion 90 slides within upper channel 20 of first sidewall 12, the second upper protrusion 94 slides within upper channel of second sidewall 16, the first lower protrusion 92 slides within lower channel 30 of first sidewall 12, and the second lower protrusion 96 slides within the lower channel of second sidewall 16).

Figure 5:
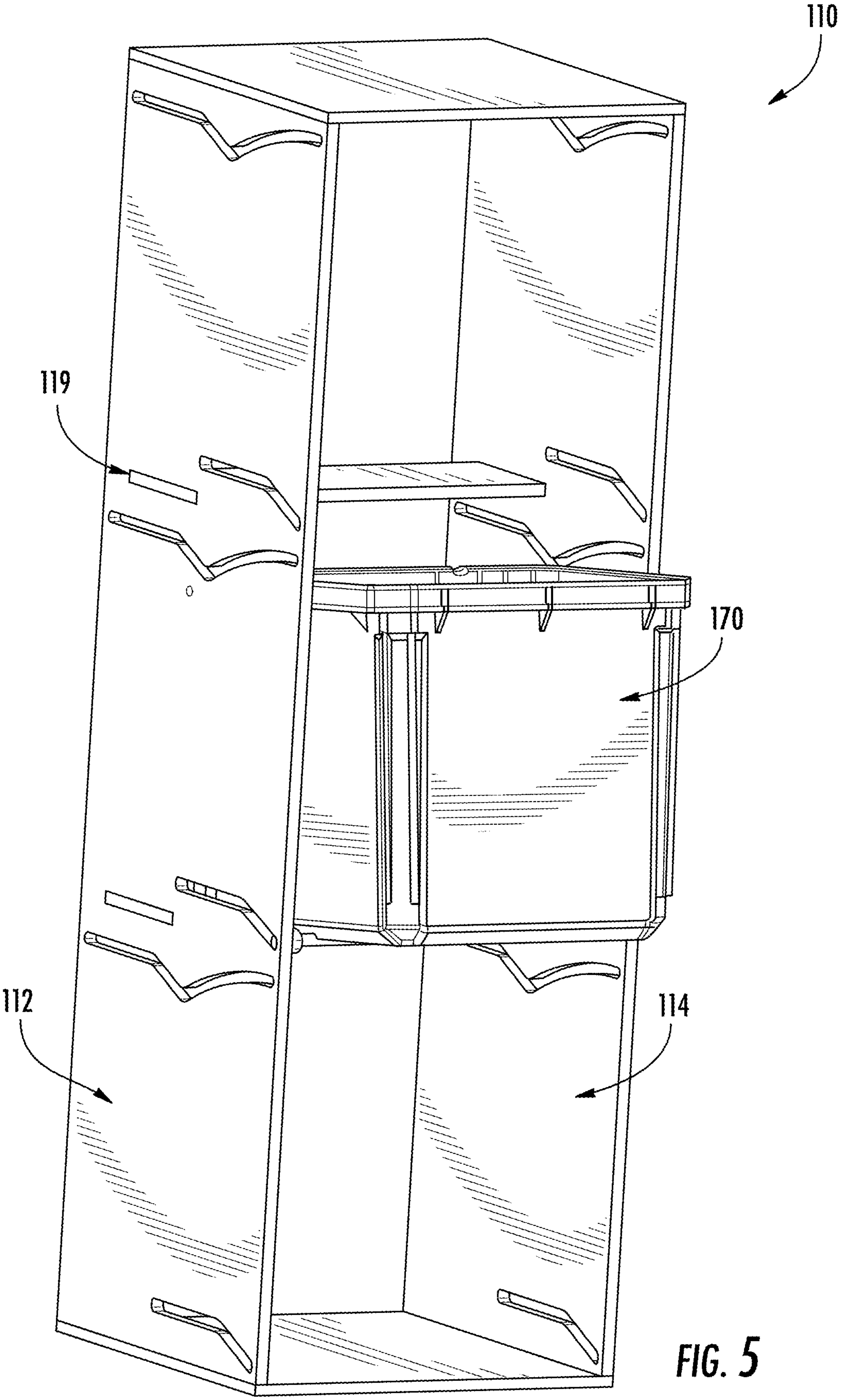
FIG. 5 is a perspective view of a storage device, according to an exemplary embodiment.

Referring to FIG. 5, various aspects of storage device 110 are shown. Storage device 110 is functionally similar to storage device 10 except for the differences described herein. For example, spacer 119 in storage device 110 is placed in different locations along sidewalls 112 and 114 with respect to container(s) 170. Although only one container 170 is shown coupled to storage device 110, it is contemplated herein that up to three containers 170 can be coupled to storage device 110, similar to storage device 10.

Figure 6:
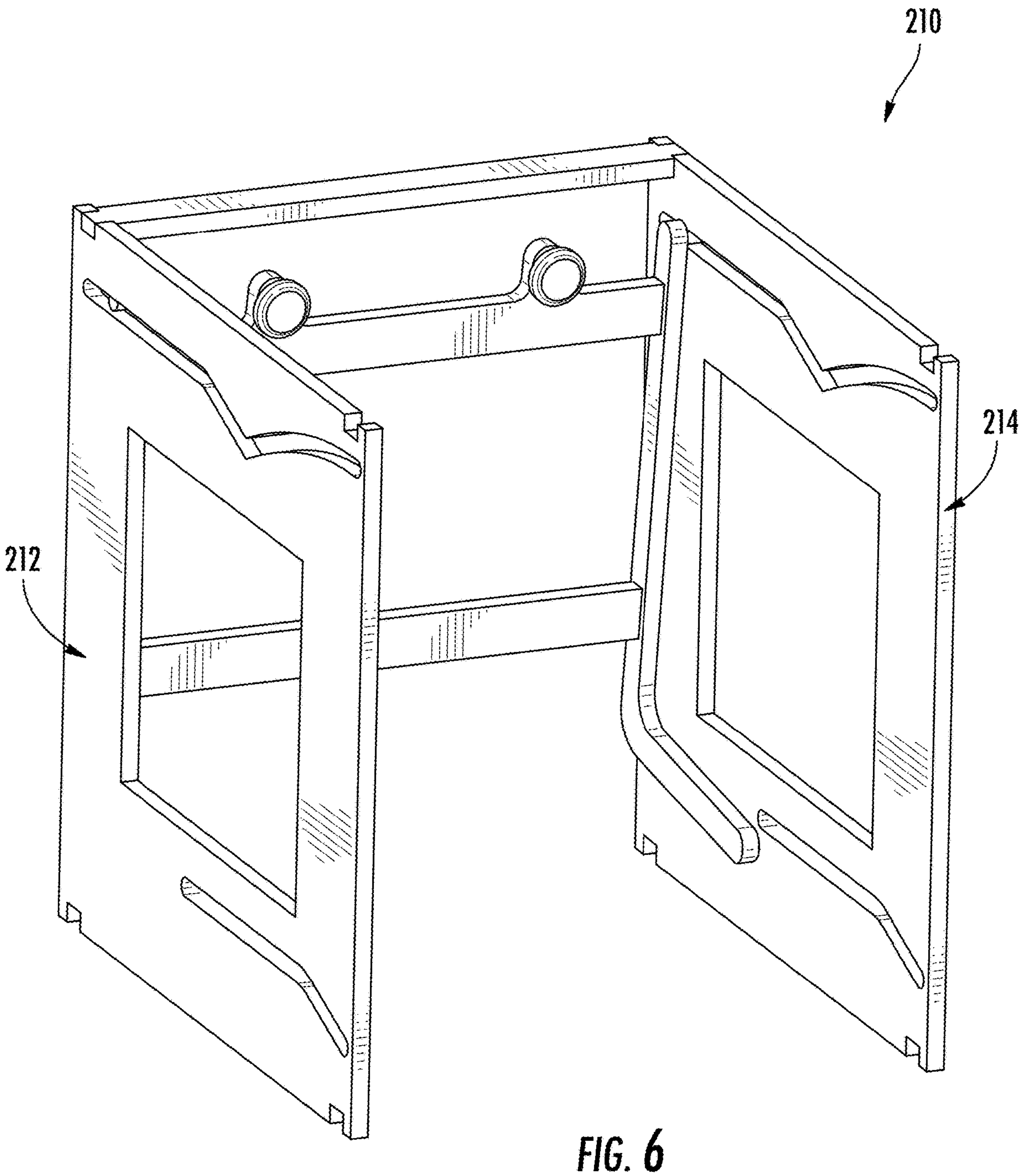
FIG. 6 is a perspective view of a portion of a storage device, according to an exemplary embodiment.

Referring to FIG. 6, various aspects of storage device 210 are shown. Storage device 210 is functionally similar to storage device 10 and storage device 110 except for the differences described herein. For example, in a specific embodiment storage device 210 includes one container, whereas storage device 10 and storage device 110 include up to three containers.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A storage device comprising:
- a first sidewall;
- a first channel extending laterally through the entire first sidewall, the first channel comprising:
  - a first end;
  - a second end; and
  - a middle portion lower than the first end and the second end;
- a second sidewall opposite the first sidewall;
- a second channel extending laterally through the entire second sidewall, the second channel comprising:
  - a first end;
  - a second end; and
  - a middle portion lower than the first end and the second end;
- a storage element defining a storage compartment, the storage element slidably and rotatably coupled to the first channel and the second channel.

2. The storage device of claim 1, further comprising:
- a third channel extending laterally through the first sidewall and positioned below the first channel; and
- a fourth channel extending laterally through the second sidewall and positioned below the second channel.

3. The storage device of claim 2, wherein the third channel further comprises:
- a first end; and
- a second end positioned below the first end of the third channel by a height.

4. The storage device of claim 2, further comprising:
- a first protrusion extending outward from the storage element and engaged with the first channel; and
- a second protrusion extending outward from the storage element, the second protrusion positioned below and in front of the first protrusion, the second protrusion engaged with the third channel.

5. The storage device of claim 4, further comprising:
- a third protrusion extending outward from the storage element in a direction away from the first protrusion, the third protrusion engaged with the second channel; and
- a fourth protrusion extending outward from the storage element, the fourth protrusion positioned below and in front of the third protrusion, the fourth protrusion engaged with the fourth channel.

6. The storage device of claim 1, wherein the storage element rotatably actuates with respect to the first sidewall and the second sidewall between a first position in which a top of the storage element faces vertically upward and a second position in which the top of the storage element faces upward and forward.

7. The storage device of claim 6, wherein the storage element rotates at least 30 degrees with respect to the first sidewall and the second sidewall when storage element rotates between the first position to the second position.

8. A storage device comprising:
- a first sidewall;
- a first upper channel extending laterally through the first sidewall between a first end and a second end;
- a first lower channel extending laterally through the first sidewall and positioned below the first upper channel, the first lower channel comprising:
  - a first end; and
  - a second end positioned below the first end of the first lower channel by a first height;
- a second sidewall opposite the first sidewall;
- a second upper channel extending laterally through the second sidewall between a first end and a second end;
- a second lower channel extending laterally through the second sidewall and positioned below the second upper channel, the second lower channel comprising:
  - a first end; and
  - a second end positioned below the first end of the second lower channel by the first height;

a rear wall extending between and connecting the first sidewall and the second sidewall; and a storage element defining a storage compartment, the storage element slidably and rotatably coupled to the first sidewall and the second sidewall;

wherein the first end of the second lower channel is positioned between the rear wall and the second end of the second lower channel.

9. The storage device of claim 8, wherein the first upper channel further comprises a middle portion positioned between the first end and the second end of the first upper channel, and wherein the middle portion is positioned below the first end and the second end of the first upper channel.

10. The storage device of claim 9, wherein the middle portion of the first upper channel is positioned below the first end of the first upper channel by a second height.

11. The storage device of claim 10, wherein the first height is the same as the second height.

12. The storage device of claim 8, further comprising:

a first upper protrusion extending from the storage element and slideably engaged with the first upper channel;

a second upper protrusion extending from the storage element away from the first upper protrusion, the second upper protrusion slideably engaged with the second upper channel;

a first lower protrusion extending from the storage element and slideably engaged with the first lower channel; and a second lower protrusion extending from the storage element away from the first lower protrusion, the second lower protrusion slideably engaged with the second lower channel.

13. The storage device of claim 8, wherein the first end of the first lower channel is positioned between the rear wall and the second end of the first lower channel.

14. The storage device of claim 8, wherein the storage element is rotatable between a first position in which a top of the storage element faces vertically and a second position in which the top of the storage element faces upward at an angle relative to the first sidewall and the second sidewall, and wherein the storage element rotates at least 25 degrees with respect to the first sidewall and the second sidewall when the storage element rotates from the first position to the second position.

15. A storage device comprising:

a first sidewall comprising a first front surface;

a second sidewall opposing the first sidewall and comprising a second front surface;

a rear wall extending between and connecting the first sidewall and the second sidewall;

an opening between the first sidewall and the second sidewall, the opening opposing the rear wall;

a first channel extending laterally through the first sidewall, the first channel comprising:

a first end;

a second end; and a middle portion between the first end and the second end, wherein the first end is positioned between the opening and the middle portion, and wherein the middle portion is lower than the second end; and a storage element comprising a storage compartment connected to an upper opening;

wherein the storage element is slidably coupled to the first sidewall and the second sidewall such that the storage element is slidable along the first sidewall and the second sidewall toward and away from the rear wall; and wherein the storage element is rotatable with respect to the first sidewall and the second sidewall between a first position in which the upper opening is partially between the first sidewall and the second sidewall and a second position in which the entire upper opening is positioned in front of the first front surface of the first sidewall and the second front surface of the second sidewall.

16. The storage device of claim 15, wherein the middle portion is lower than the first end.

17. The storage device of claim 16, further comprising a second channel extending laterally through the first sidewall and positioned below the first channel, the second channel comprising:

a first end; and a second end positioned below the first end of the second channel by a height.

18. The storage device of claim 17, further comprising:

a third channel extending laterally through the second sidewall, the third channel comprising:

a first end;

a second end; and a middle portion lower than the first end and the second end; and a fourth channel extending laterally through the second sidewall and positioned below the third channel, the fourth channel comprising:

a first end; and a second end positioned below the first end of the fourth channel by a height.

19. The storage device of claim 15, wherein the storage element slidably moves between a stowed position in which the storage element is retracted within the storage device and a forward position in which the storage element extends past the first front surface of the first sidewall and the second front surface of the second sidewall.

20. The storage device of claim 19, wherein, when the storage element is located in the forward position and the storage element rotates with respect to the first sidewall and the second sidewall, the entire upper opening of the storage element faces upward and forward relative to the first front surface and the second front surface.

* * * * *